Patented Jan. 14, 1947

2,414,300

UNITED STATES PATENT OFFICE 2,414,300

ELECTRICAL INSULATING COMPOUNDS

George Monty Hamilton, London, England, assignor to Callender's Cable & Construction Company Limited, London, England, a British company No Drawing. Application December 28, 1943, Serial No. 515,995. In Great Britain February 2, 1943

3 Claims. (Cl. 252—63.2)

This invention is concerned with electrically insulating compositions of the kind which are made pourable by heating and set on cooling. Such compositions have commonly been made by adding, to a suitable mineral oil, material which increases its viscosity. The suitability of mineral oils for electrical purposes is a matter of general knowledge to manufacturers of electric cables and apparatus. See, for instance, the Symposium consisting of four papers in the Journal of the Institution of Electrical Engineers, part II, pages 3 to 64, vol. 90, 1943. As an additional material for increasing viscosity rosin has largely been employed in the past, but a material producing a composition with better electrical and mechanical properties has been sought for. Solid polymerised ethylene has properties which suggest its suitability as such an additional material, but although it readily forms a solution with oil, it is not satisfactory for making a composition because as the solution is cooled the polymerised ethylene crystallizes and separates from the solvent oil.

By the present invention a composition is produced which has solid polymerised ethylene as one of its principal constituents and which has the properties desirable in a high grade electrically insulating composition. This improved composition comprises solid polymerised ethylene, mineral oil and a material soluble in the oil which inhibits the crystallization of the solid polymerised ethylene and which is itself a satisfactory insulating material. Rubbery hydrocarbon polymers which are soluble in mineral oil are used for this purpose. Examples of these materials are natural rubber and some synthetic rubbers. The latter include polyisobutylene, polymerised butadiene and the co-polymers of butadiene and styrene.

By the term "solid polymerised ethylene" as used herein it is intended to indicate polymerised ethylene having a softening point by the ball and ring method which is not less than 100° C.

A range of proportions for the constituents of the composition is available and a choice is made from it depending upon the precise characteristics of the composition required and other considerations. Polymerised ethylene may be used as from 5 to 30% by weight of the whole. Less than 5% gives a composition which is too soft and if there is more than 30% it is difficult to inhibit crystallization. The proportion of added material is decided by the requirement that it should inhibit the crystallization of the polymerised ethylene on cooling. This proportion is dependent upon the properties of the added material; for instance, with polyisobutylene having a mean molecular weight of 200,000, ½% will suffice, whereas if polyisobutylene of a mean molecular weight of 15,000 is used, the proportion must be increased to 30%. This dependence on degree of polymerisation is a characteristic of all the rubbery hydro-carbon polymers mentioned. The limits of ½% and 30% cover the proportions which can be employed for these materials. An example of a satisfactory composition is as follows:

| | Per cent by weight |
|---|---|
| Solid polymerised ethylene | 15 |
| Polyisobutylene with mean molecular weight 35,000 | 15 |
| Naphthene base oil | 70 |

Polyisobutylene has the advantage over the other rubbery hydrocarbon polymers mentioned in that it is saturated and is, therefore, not liable to oxidation, thus facilitating the handling of the compositions, both during mixing and in storage and use, since the material maintains its properties without special precautions against oxidation.

The composition may be made by putting the ingredients in a steam heated kettle and raising them there to an appropriate temperature say 130° C. and keeping them at that temperature and shut off from the air while being stirred. In this process the polymerised ethylene rapidly dissolved. The added rubbery material enters into solution by a slower process. The composition is ready when this solution has taken place. The composition can then be allowed to cool. In cooling it solidifies: it is kept in the solid state until required for use. It is then heated up again so as to be made sufficiently liquid for pouring. A suitable pouring temperature is 150° C. and at this the composition has a viscosity of from 10 to 20 poises.

The improved composition has a number of important properties which make it useful for certain purposes. In particular it is well adapted for the filling composition of cable joints, sealing ends and terminations. It is insoluble in normal cable impregnants up to the maximum operating temperature of the cable, and, therefore, cannot be softened by contact with these in the joint or elsewhere. Accordingly, in a joint the composition forms a barrier which prevents the movement of impregnant from the cable, such as might tend to occur under the influence of gravity when the cable is laid on a gradient. A composition having the same, or a similar oil as the cable impregnant, will adhere to the exposed surface of the cable dielectric. The composition has extremely good electrical properties. It is easy to make and is stable under temperature rise until a temperature of at least 80° C. is reached, so that it has the characteristics of a solid well above the maximum working temperature of a cable.

The improved composition can also be used advantageously for the sealing and enclosure of small embedded electrical equipment, for instance, small transformers.

What I claim as my invention is:

1. An electrically insulating composition which is pourable when hot and solid at normal temperatures, consisting substantially of suitable mineral oil, solid polymerised ethylene, forming from 5% to 30% by weight of the composition, a rubbery hydrocarbon polymer selected from the group consisting of natural rubber, polyisobutylene, polymerised butadiene and the copolymers of butadiene and styrene, said polymer being soluble in the oil and inhibiting the crystallization of the polymerised ethylene during cooling of the composition, the last mentioned ingredient forming from ½% to 30% by weight of the composition.

2. An electrically insulating composition which is pourable when hot and solid at normal temperatures, consisting substantially of suitable mineral oil, solid polymerised ethylene, forming from 5% to 30% by weight of the composition and polyisobutylene forming ½% to 30% by weight of the composition.

3. An electrically insulating composition which is pourable when hot and solid at normal temperatures comprising about:

| | Per cent by weight |
|---|---|
| Naphthene base oil | 70 |
| Solid polymerised ethylene | 15 |
| Polyisobutylene with mean molecular weight 35,000 | 15 |

GEORGE MONTY HAMILTON.